(12) United States Patent
Haeger et al.

(10) Patent No.: US 9,032,050 B2
(45) Date of Patent: May 12, 2015

(54) SYSTEMS AND METHODS FOR ACCELERATING REMOTE DATA RETRIEVAL VIA PEER NODES

(71) Applicant: VMware, Inc., Palo Alto, CA (US)

(72) Inventors: Edward Scarlett Haeger, Park City, UT (US); Michael Cenname, Seattle, WA (US); Andrew Skowronski, Hudson (CA)

(73) Assignees: VMware, Inc., Palo Alto, CA (US); Decho Corporation, Seattle, WA (US)

( * ) Notice: Subject to any disclaimer, the term of this patent is extended or adjusted under 35 U.S.C. 154(b) by 275 days.

(21) Appl. No.: 13/665,637

(22) Filed: Oct. 31, 2012

(65) Prior Publication Data

US 2014/0122658 A1     May 1, 2014

(51) Int. Cl.
*H04L 29/08*     (2006.01)

(52) U.S. Cl.
CPC ........ *H04L 67/1095* (2013.01); *H04L 29/0854* (2013.01); *H04L 67/1091* (2013.01)

(58) Field of Classification Search
None
See application file for complete search history.

(56) References Cited

U.S. PATENT DOCUMENTS

| 2012/0246457 | A1* | 9/2012 | Sosnosky et al. | 713/2 |
| 2013/0305039 | A1* | 11/2013 | Gauda | 713/153 |
| 2013/0326072 | A1* | 12/2013 | Smyth et al. | 709/227 |

* cited by examiner

*Primary Examiner* — Ario Etienne
*Assistant Examiner* — Clayton R Williams

(57) ABSTRACT

In one embodiment, a client node generates a listing of files associated with a user account, where the listing includes one or more files that are stored remotely on a server system without being synchronized to local storage of the client node. The client node further receives a request to access a file from the listing and determines whether the file is stored locally on the client node. If the file is not stored locally on the client node, the client node discovers peer client nodes that are coupled with the client node and determines whether the file is stored locally on any peer client node. If the file is stored locally on a peer client node, the client node retrieves the file from the peer client node. If the file is not stored locally on any peer client node, the client node retrieves the file from the server system.

17 Claims, 3 Drawing Sheets

SYSTEMS AND METHODS FOR ACCELERATING REMOTE DATA RETRIEVAL VIA PEER NODES

BACKGROUND

With the proliferation of personal computing devices such as desktop/laptop computers, personal digital assistants (PDAs), smartphones, tablets, and the like, many users have adopted cloud storage services to access their data across the various computing devices they use/own. Generally speaking, a cloud storage service enables a user to upload files to a cloud storage server for centralized storage in a remote storage location (i.e., in "the cloud"). Once the service has stored the files in the cloud, the user can download/synchronize the files from the cloud storage server to local storage on each of the user's computing devices.

Some cloud storage services automatically synchronize data between the cloud storage server and a user's computing devices in a manner that causes each computing device to maintain, in local storage, a complete and up-to-date copy of each of the user's cloud-stored files. In this configuration (referred to as a "fully synced" configuration), the user always has local access to the latest versions of his/her files, from every computing device participating in the synchronization arrangement.

Other cloud storage services allow a user to download cloud-stored files to his/her computing devices on-demand. In this configuration (referred to as an "on-demand" configuration), a particular computing device only downloads a file from the cloud storage server to local storage when the user explicitly requests the file via that device. The computing device can then cache the downloaded file locally for future access (until, e.g., a newer version of the file becomes available on the cloud storage server).

The two approaches above have different advantages and disadvantages, and thus neither is an ideal solution for accessing cloud-stored data. With the fully synced configuration, a user will typically not experience any network delay when trying to access cloud-stored files on his/her computing devices because the user's computing devices store synchronized copies of the files locally. Further, the user can access the files while offline. However, the locally stored files can potentially consume a large amount of local storage space on each computing device. The on-demand configuration minimizes consumption of local storage space since a computing device only downloads files from the cloud storage server that a user explicitly requests. However, the user may experience significant latency at the time of accessing a file due to the download process, particularly if the network connection between the computing device and the cloud storage server is slow or if the file is large.

SUMMARY

In one embodiment, a method for accelerating remote data retrieval is provided. The method includes generating, by a client node, a listing of files associated with a user account, where the listing includes one or more files that are stored remotely on a server system without being synchronized to local storage of the client node, and where the server system is communicatively coupled with the client node via a first network. The method further includes receiving, by the client node, a request to access a file from the listing and determining whether the file is stored locally on the client node. If the file is not stored locally on the client node, the client node discovers one or more peer client nodes that are coupled with the client node via a second network and determines whether the file is stored locally on any of the peer client nodes. If the file is stored locally on a peer client node, the client node retrieves the file from the peer client node over the second network. If the file is not stored locally on any of the peer client nodes, the client node retrieves the file from the server system over the first network.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Certain embodiments provide techniques for accelerating the on-demand downloading of cloud-stored data by a client node (e.g., a user's computing device) via one or more peers of the client node. For example, upon receiving a request to access a cloud-stored file, the client node can first check whether the cloud-stored file is stored locally on a peer client node that is connected to the client node via, e.g., a local area network (LAN). If file is stored locally on the peer client node, the client node can download the file from the peer client node over the LAN, rather than from a cloud storage server over a slower Internet or wide area network (WAN) connection. These techniques allow the client node to maintain the benefits of on-demand downloading (e.g., low local storage space consumption), while at the same time mitigating network latency that the client node may experience at the time of download. This can be particularly useful if the client node is a device that cannot accommodate a large amount of local storage, such as a smartphone, tablet, or other handheld computing device.

Figure 1:
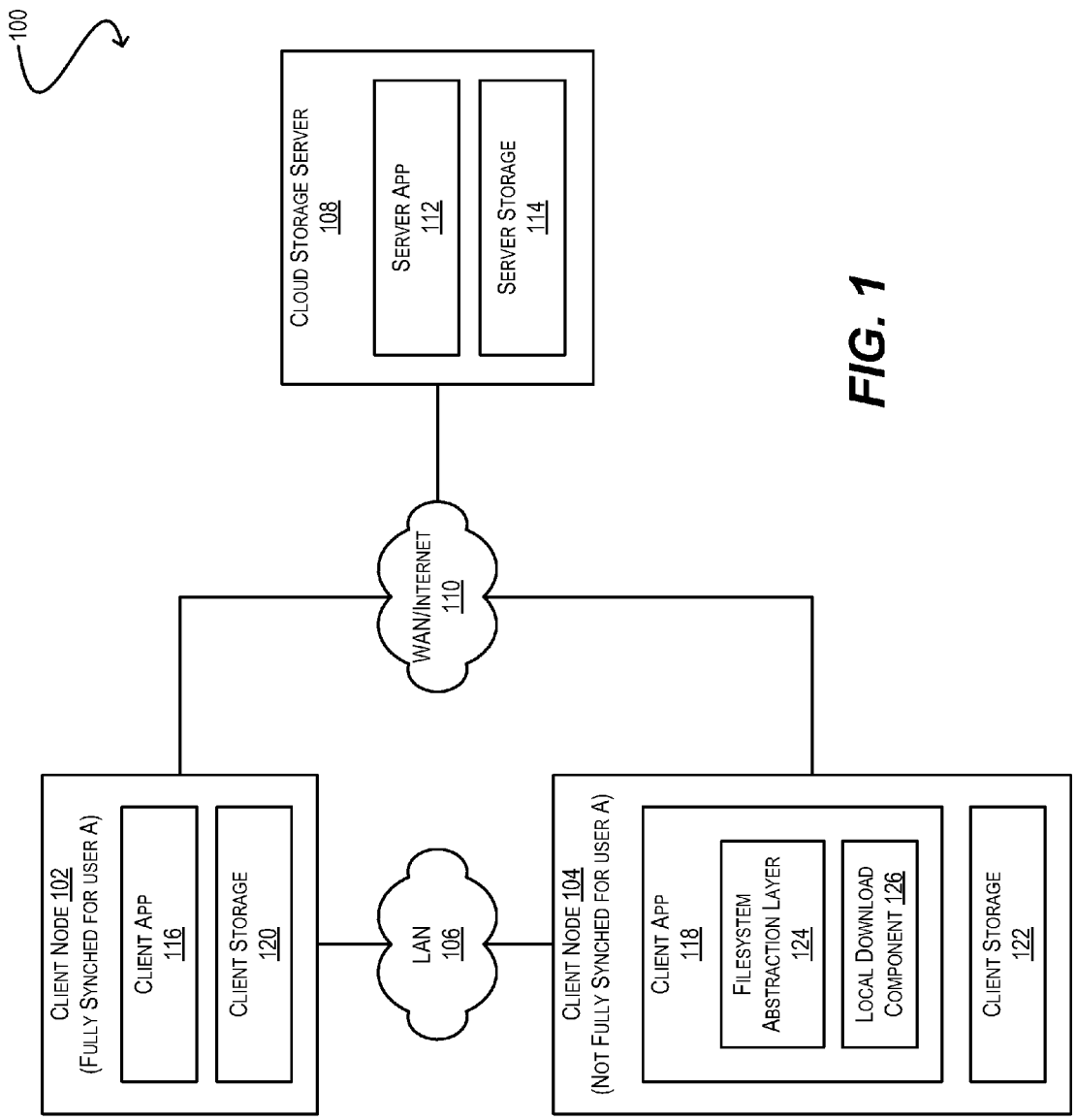
FIG. 1 illustrates a system environment according to one embodiment.

FIG. 1 illustrates a system environment 100 according to one embodiment. As shown, system environment 100 includes two client nodes (102 and 104) that are communicatively coupled to each other via a first network such as LAN 106. LAN 106 can be a wired (e.g., Ethernet over twisted pair cabling) and/or a wireless (e.g., Wi-Fi) network. In addition, system environment 100 includes a cloud storage server 108 communicatively coupled with client nodes 102 and 104 via a second network such as a WAN or the Internet (110). In alternative embodiments, the second network coupling cloud storage server 108 with client nodes 102 and 104 can be any other type of network, such as another LAN. Although FIG. 1 depicts two client nodes and one cloud storage server, one of ordinary skill in the art will appreciate that alternative embodiments can include any number of these entities.

Cloud storage server 108 can be a computer system that provides cloud storage services to various clients such as client nodes 102 and 104. In certain embodiments, cloud storage server 108 can be public server that provides cloud storage services to the general public. In other embodiments, cloud storage server 108 can be a private server that provides cloud storage services to members of a private domain, such as a corporate intranet.

As shown, cloud storage server 108 includes a server application (server app) 112 and server storage 114. Server application 112 can be implemented as a custom application or a web-based application, and can interact with client components (e.g., client applications (client apps) 116 and 118) of client nodes 102 and 104 to enable various cloud storage management functions. For example, server application 112 can receive user files that are uploaded from client nodes 102 and 104 via client applications 116 and 118 and store the files in server storage 114 (thereby placing the files in "the cloud"). Server application 112 can also facilitate the downloading and/or synchronization of cloud-stored files to storage components that are local to client nodes 102 and 104 (e.g., client storage 120 and 122).

Server storage 114 can be implemented using any type or combination of data storage devices known in the art. Although FIG. 1 depicts server storage 114 as being part of cloud storage server 108, in alternative embodiments, a machine that is separate from cloud storage server 108 (e.g., a dedicated database server) can host server storage 114.

Client nodes 102 and 104 can be hardware and/or software-based entities that end-users can operate to access the cloud storage services exposed by cloud storage server 108. In one embodiment, client nodes 102 and 104 can include computing devices, such as a desktop computer, a laptop computer, a personal digital assistant (PDA), a smartphone, a tablet, or the like. In another embodiment, client nodes 102 and 104 can include virtual machines (VMs) running on one or more underlying physical computer systems (not shown).

As noted above, client nodes 102 and 104 each include a client application 116/118 and client storage 120/122. Client application 116/118 can be implemented as a native client or a web-based client, and can interact with server application 112 to facilitate the management of cloud-stored data. Client storage 120/122 can include, e.g., a hard disk, flash memory card/drive, or any other type of non-volatile memory locally resident on client node 102/104. Client storage 120/122 can store user files that client application 116/118 uploads to cloud storage server 108, as well as user files that client application 116/118 downloads and/or synchronizes from cloud storage server 108.

In the embodiment of FIG. 1, client nodes 102 and 104 both provide access to the cloud-stored files of a common user ("user A"). However, the manner in which client nodes 102 and 104 download or synchronize user A's cloud-stored files differ. In particular, FIG. 1 shows client node 102 as being "fully synced" with respect to user A. In other words, client application 116 of client node 102 interoperates with server application 112 to automatically synchronize all of user A's cloud-stored files from server storage 114 to client storage 120, thereby causing client node 102 to maintain, at all times (or most of the time), a complete and up-to-date copy of each file in client storage 120.

In contrast, FIG. 1 shows client node 104 as being not fully synced with respect to user A. In other words, client application 118 of client node 104 does not automatically synchronize all of user A's cloud-stored files from server storage 114 to client storage 122. Instead, one or more of user A's cloud-stored files remain unsynchronized (i.e., stored in server storage 114, without having a corresponding local copy stored in client storage 122). Client node 104 can download these unsynchronized files on-demand. For instance, if user A wishes to access an unsynchronized file via client node 104, user A can explicitly request that file. In response, client node 104 can download the file from cloud storage server 108 over WAN/Internet 110 to client storage 122, where the file can be accessed by user A and cached for future use. In certain embodiments, client node 104 can occasionally purge client storage 122 of files that have been downloaded and cached in this manner to limit the amount of local storage space that is consumed by cached files. This purging process can delete cached files based on the time at which they were last accessed (with oldest-accessed files being deleted first), and can occur at predetermined time intervals or in response to a trigger event (e.g., growth of the file cache beyond a predefined maximum size).

To facilitate on-demand downloading, client application 118 can include a filesystem abstraction layer (FAL) 124. FAL 124 acts as an intermediary between client application 118 and the local file system of client node 104, and can generate a unified listing of user files that client node 104 stores locally (e.g., in client storage 122) and cloud storage server 108 stores remotely (e.g., in server storage 114). For example, with respect to user A, FAL 124 can generate a unified listing of user A's files that are (1) cached in client storage 122 of client node 104 and (2) stored in server storage 114 of cloud storage server 108 (without a corresponding copy in client storage 122). FAL 124 can then expose this unified listing of files when user A interacts with the local file system of client node 104, thereby giving user A the impression that the remotely stored files are stored locally in client storage 122. For instance, FAL 124 can expose this unified listing of files when user A browses the contents of client storage 122 via, e.g., a file browser window (such as Windows Explorer, OSX Finder, etc.), or when user A attempts to access a file via a file open dialog window. FAL 124 can also expose this unified listing of files within client application 118. When user A requests access to a file in the unified listing, FAL 124 can determine whether the file is actually stored locally or remotely. FAL 124 can then transparently retrieve the file from the appropriate local or remote location.

In one embodiment, FAL 124 can be implemented using a virtual file system (VFS) framework that is built into the OS running on client node 104, such as the Filesystem in Userspace (FUSE) framework that is built into Linux and UNIX-based OSs. In alternative embodiments, FAL 124 can be implemented using any type of application-level or OS-level mechanism that allows for the unified presentation and retrieval of locally stored and remotely stored files.

As noted in the Background section, one benefit of the "on-demand" configuration of client node 104 is that this on-demand configuration minimizes local storage consumption because client node 104 only downloads files from cloud storage server 108 over WAN/Internet 110 that user A explicitly requests. However, since WAN/Internet connections are typically limited in bandwidth, this download process can be slow, particularly if the files are large. This can cause user A to experience significant latency at the time of requesting/accessing a cloud-stored file via client node 104.

To mitigate this latency issue, in certain embodiments client application 118 can further include a local download component 126. Local download component 126 can leverage the relatively high-speed LAN connection between client node 104 and client node 102 to accelerate client node 104's retrieval of cloud-stored files. For example, assume client node 104 receives, from user A, a request to access a cloud-stored file that has not been cached locally in client storage 120. Rather than initiating a download of the file from cloud storage server 108 over WAN/Internet 110, FAL 124 can invoke local download component 126. Local download component 126 can discover one or more other client nodes on LAN 106 (referred to as "peer client nodes") and determine that one of the peer client nodes—for instance, fully synced client node 102—has a local copy of the requested file. Local download component 126 can then download the file directly from client node 102 over LAN 106, thereby obviating the need to download the file from cloud storage server 108 over WAN/Internet 110.

With the approach above, local download component 126 can substantially reduce the latency that user A experiences at the time of requesting a cloud-stored file via client node 104, since downloading the file from fully synced client node 102 over LAN 106 will generally be substantially faster than downloading the file from cloud storage server 108 over WAN/Internet 110. At the same time, the consumption of local storage 122 can be kept low, since client node 104 remains in an on-demand (rather than fully synced) configuration. Thus, this approach can enable relatively fast access to cloud-stored files on computing devices that cannot accommodate a large amount of local storage space, such as small form factor or low cost devices. In a particular embodiment, client node 104 can be implemented using a smartphone, a tablet, or some other type of handheld computing device.

Figure 2:
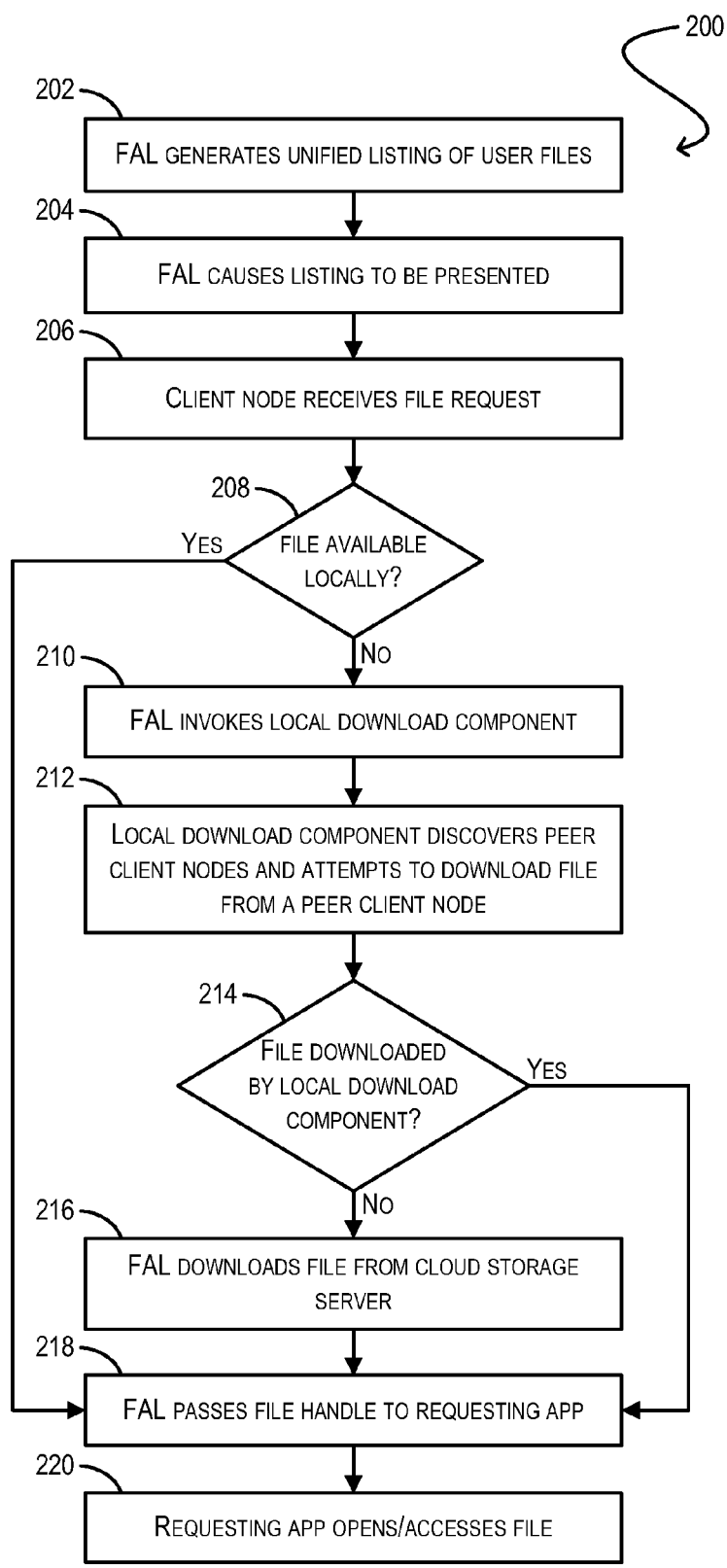
FIG. 2 illustrates a process performed by a client node for accelerating remote data retrieval according to one embodiment.

FIG. 2 illustrates a process 200 that can be performed by client application 118 of client node 104 (and its subcomponents FAL 124 and local download component 126) for accelerating on-demand retrieval of cloud-stored files according to one embodiment. At block 202, FAL 124 can generate a listing of files associated with a user (or user account). As noted with respect to FIG. 1, this listing can be a unified listing that includes (1) the subset of the user's files that is cached locally in client storage 122 of client node 104, and (2) the subset of the user's files that is stored remotely in server storage 114 of cloud storage server 108, without having corresponding local copies in client storage 122. Once generated, FAL 124 can cause this listing to be presented (via, e.g., client application 118 or some other component/application running on client node 104) (e.g., file browser window, file open dialog, etc.)) to the user (block 204).

At block 206, client node 104 can receive a request to access a file in the listing. In one embodiment, this request can be received from the user in response to the file listing presented at block 204. In other embodiments, the request can be received from an automated/programmatic process running on client node 104. At block 208, FAL 124 can determine whether or not client node 104 has stored the requested file locally (e.g., cached in client storage 122). If the requested file is available locally, FAL 124 can pass a handle to the locally stored file to the requesting application (e.g., client application 118) (block 218). The requesting application can then open or otherwise access the file (block 220) and process 200 can end (or loop back to block 206 to handle additional file requests from the user).

On the other hand, if client node 104 has not stored the requested file locally, FAL 124 (or client application 118) can invoke local download component 126 (block 210). Local download component 126 can discover one or more peer client nodes that are connected to client node 104 over LAN 106 (block 212). As used herein, a "peer client node" is any type of network entity that a target client node (e.g., client node 104) can access via an appropriate communication protocol. In the embodiment of FIG. 1, one such peer client node is client node 102. Local download component 126 can then attempt to download the requested file from one of the discovered peer client nodes (block 212).

Figure 3:
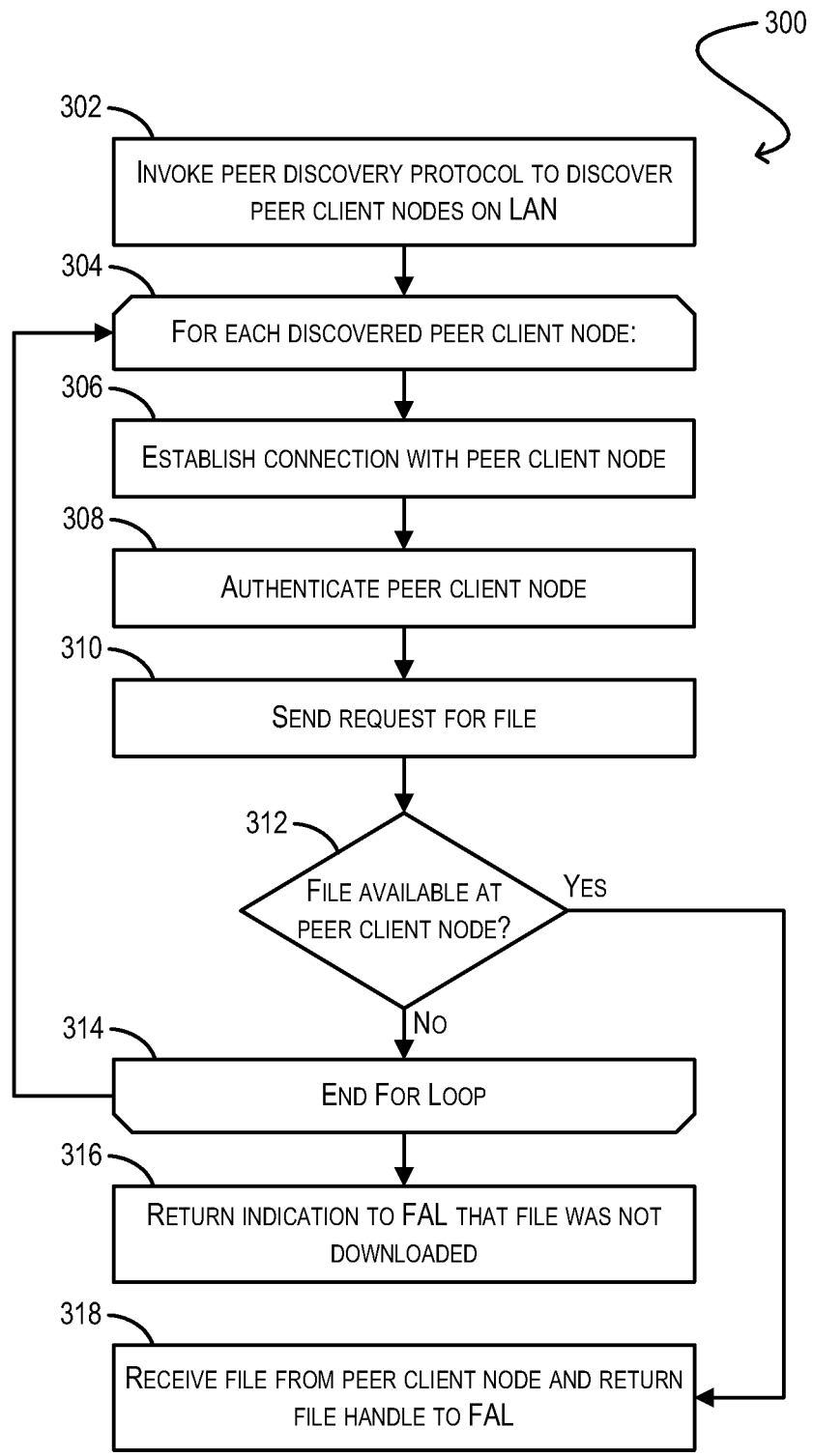
FIG. 3 illustrates a process performed by a local download component of a client node for downloading data from a peer client node according to one embodiment.

FIG. 3 illustrates a process 300 that can be performed by local download component 126 within the context of block 212 of FIG. 2. At block 302, local download component 126 can invoke a peer discovery protocol for discovering peer client nodes of client node 104 on LAN 106. In one embodiment, the peer discovery protocol can be a standard IP network configuration/discovery protocol, such as the Bonjour™ protocol developed by Apple, Inc. In other embodiments, the peer discovery protocol can be a proprietary protocol.

At block 304, local download component 126 can enter a loop for each discovered peer client node. Within the loop, local download component 126 can establish a connection with the current peer client node and authenticate the peer client node (blocks 306, 308). This authentication process can include determining whether the peer client node is configured to access the same cloud storage server as client node 104 (e.g., cloud storage server 108), and whether the peer client node is authorized to access the cloud-stored files of the current user.

Assuming that the authentication process successfully authenticates the peer client node at block 308, local download component 126 can transmit a download request for the user-requested file to the peer client node (block 310). The download request can include, e.g., an identifier that uniquely identifies the file. In response, the peer client node can determine whether the requested file is stored locally on the peer client node.

If requested file is available locally at the peer client node (block 312), local download component 126 can receive a copy of the file from the peer client node over LAN 106, cache the file in client storage 122, and return a handle to the locally cached file to VFS 124 (block 318). This outcome will typically occur if the peer client node is a fully synced node (e.g., client node 102 of FIG. 1), since such fully synced nodes will generally always maintain a synchronized copy of each of the user's cloud-stored files in client storage.

If the requested file is not available locally at the peer client node (block 312), local download component 126 can reach the end of the current loop iteration (block 314) and return to block 304 to process the next discovered peer client node. If local download component 126 loops through all of the discovered peer client nodes without finding any peer client node that has locally stored the requested file, local download component 126 can return an indication to VFS 124 that the file could not be downloaded locally (block 316).

Returning to FIG. 2, at block 214 VFS 124 can determine whether local download component 126 has successfully downloaded the requested file from a peer client node (by virtue of the information local download component 126 returns to VFS 124 at blocks 316 and 318). If VFS 124 receives an indication from local download component 126 that the file could not be downloaded locally per block 316, VFS 124 can download the file from cloud storage server 108 over WAN/Internet 110. Process 200 can then proceed to blocks 218 and 220, whereby client application 118 opens or accesses the file and makes the file available to the user. On the other hand, if VFS 124 receives a handle to a local copy of the file from local download component 126 per block 318 (indicating that local download component 126 successfully downloaded the file from a peer client node), process 200 can proceed directly to blocks 218 and 220, without going through the potentially slow process of downloading the file over WAN/Internet 110. In this manner, the user may perceive substantially improved latency at the time of requesting and accessing the file. Process 200 can subsequently end (or loop back to block 206 to handle additional file requests from the user).

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

Boundaries between the various components, operations and data stores described herein are somewhat arbitrary, and particular operations are illustrated in the context of specific illustrative configurations. Other allocations of functionality are envisioned and may fall within the scope of embodiments of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method performed by a client node for accelerating remote data retrieval, the method comprising:
   generating, by a file system abstraction layer (FAL) running on the client node, a listing of files associated with a user account, the listing of files including one or more files that are stored remotely on a server system without being synchronized to local storage of the client node, the server system being communicatively coupled with the client node via a first network;
   receiving, by the client node, a request to access a file from the listing of files;
   determining, by the FAL, whether the file is stored locally on the client node; and
   if the file is not stored locally on the client node:
      discovering, by the client node, one or more peer client nodes that are communicatively coupled with the client node via a second network;
      determining, by the client node, whether the file is stored locally on a first peer client node in the one or more peer client nodes, the first peer client node being fully synchronized with respect to the user account, such that the first peer client node automatically downloads copies of all of the files associated with the user account from the server system to local storage of the first peer client node;
      if the file is stored locally on the first peer client node, retrieving, by the client node, the file from the first peer client node over the second network; and
      if the file is not stored locally on any of the peer client nodes, retrieving, by the client node, the file from the server system over the first network.

2. The method of claim 1 wherein the discovering of the one or more peer client nodes, the determining whether the file is stored locally on the first peer client node, and the retrieving of the file from the first peer client node are performed by a local download component that is in communication with the FAL.

3. The method of claim 1 wherein the first peer client node is communicatively coupled with the server system via the first network.

4. The method of claim 1 wherein the listing further includes one or more files that are stored remotely on the server system as well as stored locally on the client node, and wherein the method further comprises:
   if the file is stored locally on the client node, retrieving the file from the local storage of the client node.

5. The method of claim 1 wherein determining whether the file is stored locally on the first peer client node comprises:
   establishing a connection with the first peer client node;
   transmitting, to the first peer client node, a request to download the file, the request including an identifier of the file; and
   receiving, from the first peer client node in response to the request, a copy of the file or an indication that the file is not available on the peer client node.

6. The method of claim 1 wherein the first network has lower bandwidth than the second network.

7. The method of claim 6 wherein the first network is a wide area network (WAN) and the second network is a local area network (LAN).

8. The method of claim 1 wherein the first peer client node has greater local storage capacity than the client node.

9. The method of claim 1 wherein the client node is a handheld computing device.

10. The method of claim 1 wherein the client node is a virtual machine executing on a physical computer system.

11. A non-transitory computer readable storage medium embodying computer software causing a client node to execute a method, the method comprising:

generating, via filesystem abstraction layer (FAL) running on the client node, a listing of files associated with a user account, the listing of files including one or more files that are stored remotely on a server system without being synchronized to local storage of the client node, the server system being communicatively coupled with the client node via a first network;

receiving a request to access a file from the listing of files;

determining, via the FAL, whether the file is stored locally on the client node; and if the file is not stored locally on the client node:

discovering one or more peer client nodes that are communicatively coupled with the client node via a second network;

determining whether the file is stored locally on a first peer client node in the one or more peer client nodes, the first peer client node being fully synchronized with respect to the user account, such that the first peer client node automatically downloads copies of all of the files associated with the user account from the server system to local storage of the first peer client node;

if the file is stored locally on the first peer client node, retrieving the file from the first peer client node over the second network; and if the file is not stored locally on any of the peer client nodes, retrieving the file from the server system over the first network.

12. The non-transitory computer readable storage medium of claim 11 wherein the discovering of the one or more peer client nodes, the determining whether the file is stored locally on the first peer client-node, and the retrieving of the file from the first peer client node are performed by a local download component that is in communication with the FAL.

13. The non-transitory computer readable storage medium of claim 11 wherein the first peer client node is communicatively coupled with the server system via the first network.

14. A computing device configured to accelerate remote data retrieval, the computing device comprising:

a local storage device; and a processor configured to:

generate, via filesystem abstraction layer (FAL) running on the processor, a listing of files associated with a user account, the listing of files including one or more files that are stored remotely on a server system without being synchronized to the local storage device, the server system being communicatively coupled with the computing device via a first network;

receive a request to access a file from the listing of files;

determine, via the FAL, whether the file is stored in the local storage device; and if the file is not stored in the local storage device:

discover one or more peer client nodes that are communicatively coupled with the computing device via a second network;

determine whether the file is stored locally on a first peer client node in the one or more peer client nodes, the first peer client node being fully synchronized with respect to the user account, such that the first peer client node automatically downloads copies of all of the files associated with the user account from the server system to local storage of the first peer client node;

if the file is stored locally on the first peer client node, retrieve the file from the first peer client node over the second network; and if the file is not stored locally on any of the peer client nodes, retrieve the file from the server system over the first network.

15. The computing device of claim 14 wherein the discovering of the one or more peer client nodes, the determining whether the file is stored locally on the first peer client node, and the retrieving of the file from the first peer client node are performed by a local download component that is in communication with the FAL.

16. The computing device of claim 14 wherein the first peer client node is communicatively coupled with the server system via the first network.

17. The computing device of claim 14 wherein the computing device is a smartphone or tablet.

* * * * *